May 28, 1963 J. P. HARRIS 3,091,380

DRIVING MEANS FOR MAGNETIC TAPE

Filed Aug. 25, 1960 4 Sheets-Sheet 1

INVENTOR.
JOHN P. HARRIS

BY

ATTORNEY

May 28, 1963 J. P. HARRIS 3,091,380

DRIVING MEANS FOR MAGNETIC TAPE

Filed Aug. 25, 1960 4 Sheets-Sheet 2

3,091,380
DRIVING MEANS FOR MAGNETIC TAPE

John P. Harris, Wappingers Falls, N.Y., assignor to International Business Machines Corporation, New York, N.Y., a corporation of New York Filed Aug. 25, 1960, Ser. No. 51,851
4 Claims. (Cl. 226—50)

This invention relates to record tape transport mechanism. More particularly, the invention relates to improved means for feeding a record tape to a tape processing head.

Electronic computers and data processing systems ordinarily receive input data from magnetic tape and transmit output data to magnetic tape. Various tape driving mechanisms have been employed for driving the tape between a pair of tape reels such that a magnetic tape record may be read from or written upon the tape by a tape processing head located along the path of the tape between the reels. Conventionally, these drives have means for very rapidly accelerating and decelerating the tape at the location of the tape processing head, and those in use today are capable of feeding tape at high speed.

Tape transports in use today feed tape over the tape processing head by pulling the tape across the head from the downstream side thereof. A tape drive for this purpose is disclosed in United States Patent 2,792,217 to James A. Weidenhammer and Walter S. Buslik. This method of feeding tape has not been entirely satisfactory heretofore because of the fact that a substantial amount of tension is developed in the tape in the region of the tape processing head and the associated tape guides and drive capstans which resulted in an undesirable amount of wear of tape and guide surfaces. Moreover, the introduction of thin air films between the tape and its bearing surfaces as a lubricant has brought to light the fact that the tension in the tape in the region of these bearing surfaces should be minimized in order to take full advantage of the virtues inherent in the use of the lubricating film.

While the invention may be advantageously employed in all types of tape driving systems, it is expected that the invention will have particular utility in tape transport mechanism which utilizes a thin film of air as a lubricant between a moving tape and the tape processing head and guide surfaces over which tape is driven. One such transport system is disclosed in application for United States patent, Serial No. 847,762, filed October 21, 1959, by Heard K. Baumeister and Vladimir Nejezchleb for Hydrodynamically Air Lubricated Magnetic Tape Head.

The invention is predicated on the concept that tape tensions can be reduced to a minimum if the tape at each side of the tape driving mechanism is maintained at a moderate tension, and the tape is delivered to the tape processing head from the upstream side thereof, such that the applied tension on the tape at the downstream side of the tape driving mechanism constitutes the force by which the tape is drawn across the tape processing head.

The reduced tension results in less tendency to drag or to "land" the tape on the hydrostatically lubricated air bearings. This improves tape acceleration and reduces wear. Since the tension is lowered and the drag over the fixed components is a function of the tension, the total drag is less, thereby additionally reducing the time required to bring the tape up to speed. Finally, the hydrodynamically lubricated air film between the tape and the underlying surfaces becomes effective more rapidly since the air film builds up more rapidly at lower tape tension.

The full nature of the invention and a specific embodiment of mechanism for performing the invention will become clear from a reading of the following specification in light of the drawings, in which.

The invention herein is designed for use in magnetic record tape transports of all types, wherein a tape is moved over a tape processing head. The invention may be embodied, for example, in a tape transport of the kind shown in the aforesaid Weidenhammer and Buslik patent. In that patent, tape is fed between a pair of tape reels by way of a pair of vacuum columns into which the tape is looped and which serve to maintain the tape loops under a moderate tension. Located between the vacuum columns is a tape processing head over which the tape is driven by means of a pair of oppositely rotating tape driving capstans, one of which is located at each side of the tape processing head. Whereas, the tape driving capstan system in the aforesaid Weidenhammer and Buslik patent is constructed and arranged to pull tape across the tape processing head from the downstream side of the head for both directions of tape movement across the head, it is the purpose of this invention to modify the tape driving system such that tape is delivered to the tape processing head from the upstream side of the head for either direction of tape movement. When so modified, the moderate tension under which the tape is held in the vacuum control column at the downstream side of the tape processing head, will constitute the force by which the tape is pulled across the head such that tape tensions are reduced.

Figure 1:
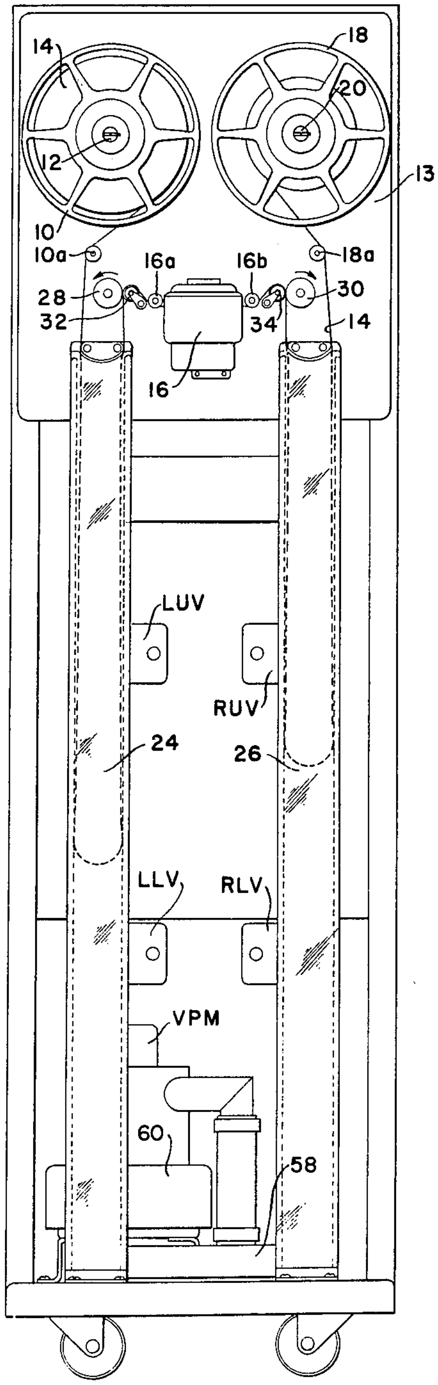
FIG. 1 is a front elevational view of a tape transport in which the invention is embodied.
Figure 2:
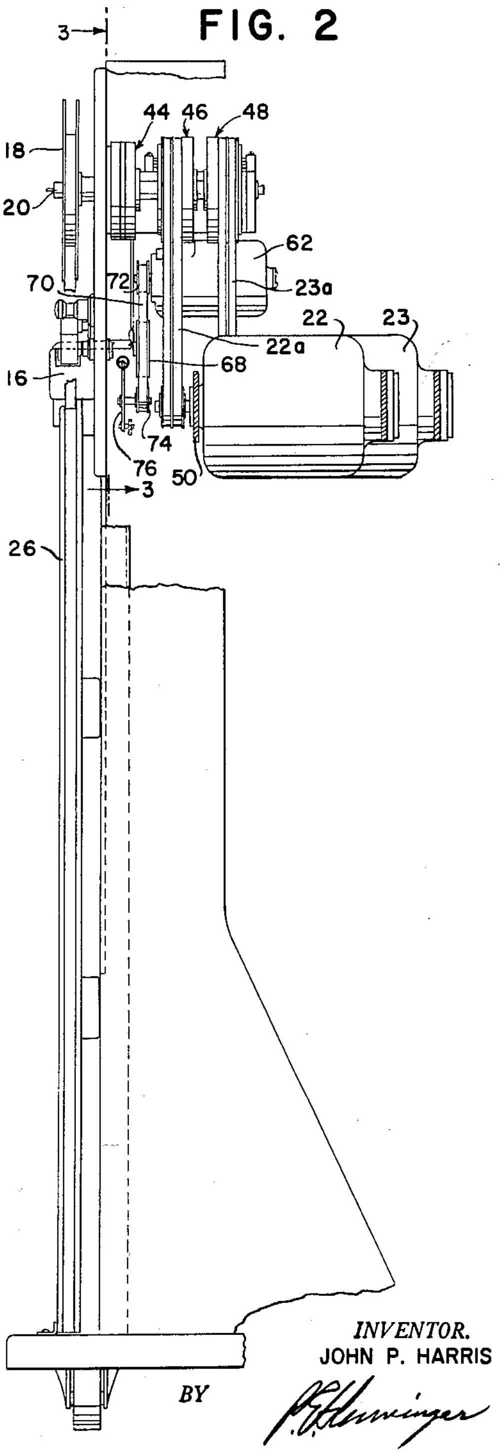
FIG. 2 is a side elevational view of the transport shown in FIG. 1.

A general understanding of a machine in which the invention is embodied may be attained by reference to FIGS. 1 and 2 of the drawings. A pair of tape reels adapted to hold a coil of record tape are intermittently driven to provide a pair of tape loops from which a tape driving capstan system may draw tape during the feed thereof in either of two directions. A tape reel 10 which may be designated as a file reel is mounted on a drive spindle 12. It may be assumed that the reel 10 has thereon a coil of magnetic tape 14 on which the data has been recorded and from which the tape is to be fed through a tape reading and recording head unit 16. In its forward direction of feed, the tape is passed through the tape reading head unit 16 and will be coiled on a second reel 18 which may be designated herein as the machine reel. The machine reel 18 is mounted on a drive spindle 20. The file reel drive spindle 12 and the machine reel drive spindle 20 are selectively rotated in either direction by a pair of motors 22 and 23. The motor 22 is the forward motor while the motor 23 is the backward motor. The motors 22 and 23 normally impart constant drive to a pair of electromagnetic clutch mechanisms mounted on each of the drive spindles 12 and 20. An electromagnetic brake is also mounted on each of the drive spindles in order that the spindles 12 and 20 may be locked against rotation. Suitable electromagnetic clutches and electromagnetic brakes are shown in said Weidenhammer and Buslik patent.

Upon selective clutching of the electromagnetic clutch mechanism in driving relation to the drive spindles 12 and 20, these spindles and consequently the tape reels attached thereto may be caused to reel or unreel tape from the coil thereon.

Since the machine is designed for high speed feed of tape through the tape processing head 16 and for very rapid accelerations and decelerations, it is important that the tape be provided with little load thereon, and to this end the driving mechanism for the reels 10 and 18 provides a pair of tape loops disposed in a pair of elongated reel control vacuum columns 24 and 26 which are open at the top for ingress and egress of tape. Each of the columns 24 and 26 has therein means responsive to the position of the respective tape loops for maintaining a relatively stable position of these loops within the columns. The loop sensitive means within the vacuum columns 24 and 26 control the reel drive mechanism in such manner that the loops, so to speak, are self-compensating. The vacuum column structure and the tape loop control system may be according to the disclosure of the above Weidenhammer and Buslik patent; this system being the subject of claim in Weidenhammer and Buslik United States application, Serial No. 535,052, filed September 19, 1955, now Patent No. 3,057,568 as a division of now abandoned application, Serial No. 290,396, filed May 28, 1952.

The tape reel drive mechanism for each reel operates independently of the other and both reels are driven independently of the capstan system which feeds the tape through the tape processing unit 16.

Tape from the supply loops in the vacuum columns 24 and 26 is driven over the tape processing head 16 by means of a pair of normally, constantly rotating drive capstan. Any suitable method for engaging the tape in driving contact with the capstans may be employed. Mechanism for accomplishing this end is shown in the above-noted Weidenhammer and Buslik patent, and such part thereof as necessary to implement this description will be repeated herein.

Whereas, as stated, it has been conventional heretofore, as also in said Weidenhammer and Buslik patent, to so employ the tape driving capstans as to draw tape across the tape processing head by engaging the tape with the capstan located at the side of the head which is downstream in reference to tape movement, the tape drive capstans herein are employed as to engage and drive the tape toward the tape processing head from the upstream side of the head. This change results, therefore, in a positive advance of the tape toward the tape processing head with the accompanying reduction of the force heretofore employed to pull tape over the head. Tape tensions in the area of the processing head are thereby reduced, and attendant advantages are thereby obtained.

In FIG. 1, a forward tape drive capstan 28 located at one side of the tape processing head 16, may be constantly rotated in a counterclockwise direction. A similar backward tape drive capstan 30 is constantly rotated in a clockwise direction at the opposite side of the tape processing head 16. When the tape is engaged with the capstan 28, it is driven toward the tape processing head 16 from the left. In like manner, when the tape is engaged with the capstan 30, the tape is driven toward the tape processing head from the right.

As stated above, a number of suitable techniques may be employed to engage the tape with the respective tape driving capstans. Herein, each of the drive capstans 28 and 30 has associated therewith pinch rollers 32 and 34, respectively. The pinch roller 32 is adapted to move a tape trained thereabout into driving contact with the forward drive capstan 28, while the pinch roller 34 is adapted to move a tape trained thereabout into driving contact with the backward drive capstan 30. As will be pointed out more fully as the description thereof proceeds, the pinch rollers 32 and 34 are mounted on a common linkage system which is designed to impart the proper related movement to the rollers for selectively driving a tape either in a forward or a backward direction in reference to the tape processing head 16.

Figure 3:
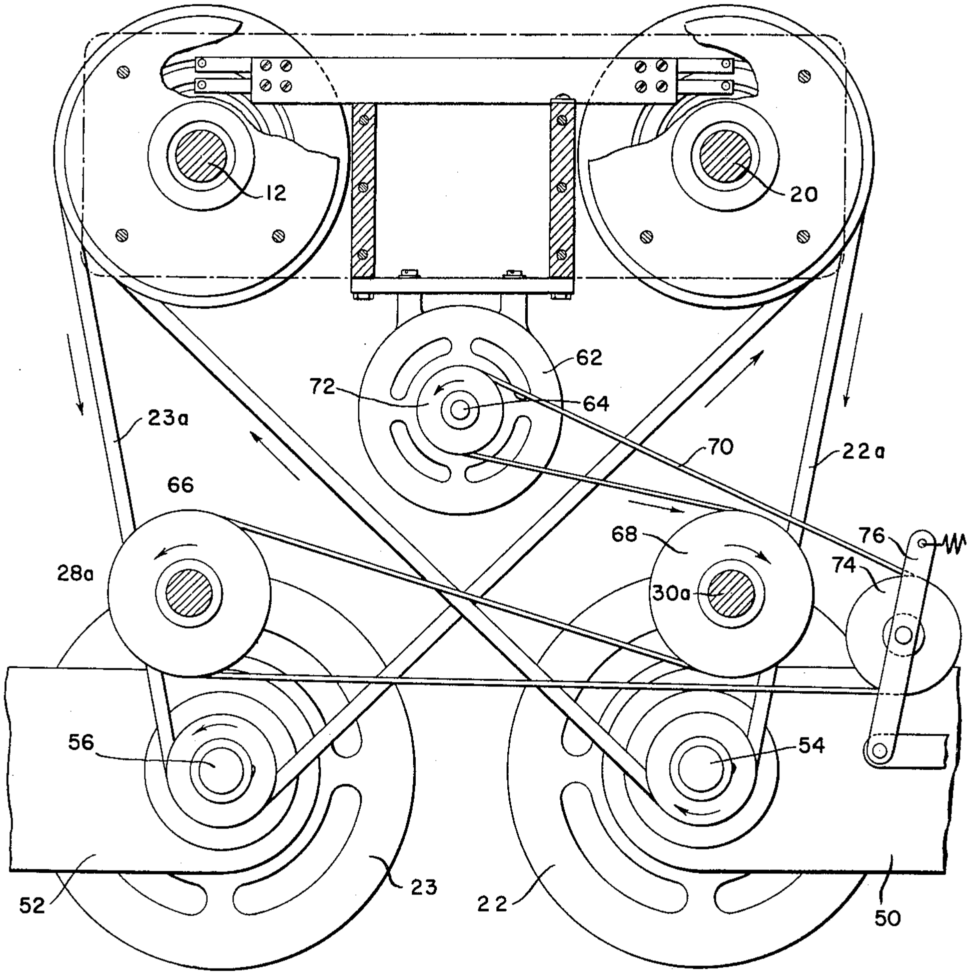
FIG. 3 is a view on line 3—3 of FIG. 2.
Figure 4:
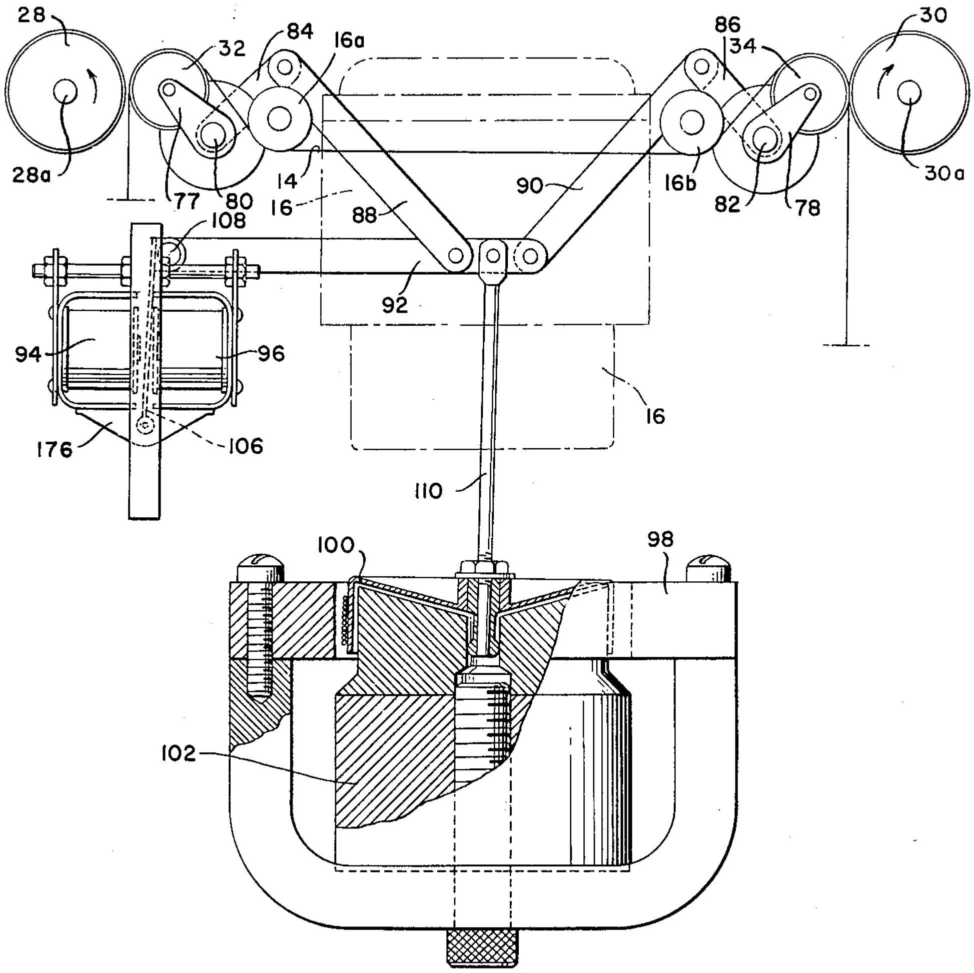
FIG. 4 illustrates tape drive mechanism and the means for biasing the mechanism into tape driving position, the view showing the parts biased into position for driving the tape from right to left.

The mechanism for driving the tape reels 10 and 18 may now be referred to in connection with FIGS. 3 and 4 of the drawings. The spindles 12 and 20 are mounted for rotation in a frame member 36, which, in turn, is mounted on the back of the main plate 13. The spindle 12 has mounted thereon an electromagnetic file reel brake 38, an electromagnetic unreeling clutch 40 and an electromagnetic reeling clutch 42. The machine reel spindle 20 has mounted thereon an electromagnetic reel brake 44, an electromagnetic reeling clutch 46 and an electromagnetic unreeling clutch 48, all as taught in said Weidenhammer and Buslik patent. The drive rings of the clutch elements 40 and 46 are adapted for continuous rotation under the influence of drive motor 22, and the drive rings of the clutch elements 42 and 48 are adapted for continuous rotation under the influence of drive motor 23.

By reference to FIG. 3 of the drawings, it may be seen that the drive motors 22 and 23 are mounted on supporting structures 50 and 52, respectively, in such position that the motor shafts 54 and 56, respectively, extend forwardly into substantially vertical alignment with their related magnetic clutch structures.

In FIG. 4 of the drawings, it will be seen that the first pair of clutches 40 and 46 are in substantial transverse alignment on their respective shafts and also that the second pair of clutches 42 and 48 are in substantial transverse alignment on their respective shafts. The clutches 40 and 46 are driven in a clockwise direction by the motor 22 through a drive belt 22*a*, while the clutches 42 and 48 are driven in a counterclockwise direction by the motor 23 through a drive belt 23*a*.

By noting FIG. 1 of the drawings, it may be seen that the file reel 10 is disposed for reeling tape thereon when driven in a counterclockwise direction, while the machine reel 18 is disposed for tape winding upon clockwise rotation. In light of this arrangement, the clutch 42 operates as a reeling clutch for the file reel 10, while the clutch 48 operates as an unreeling clutch for the machine reel 18. By the same token, the clutch 40 operates as an unreeling clutch for the file reel 10, while the clutch 46 operates as a reeling clutch for the machine reel 18.

It has been mentioned heretofore that the position of the tape loops in the control vacuum columns 24 and 26 is utilized to control the rotary movement of the tape reels. Herein, by way of example, there has been illustrated a vacuum switch control system for achieving this objective. The control columns 24 and 26 and their vacuum switch control system may be the same as shown specifically in said Weidenhammer and Buslik patent.

At the base of the columns 24 and 26 is a vacuum header 58 with which the columns communicate. The header 58 is connected to a vacuum pump 60 (FIG. 1) driven by a suitable motor VPM. The foregoing provides a structure by means of which the control columns 24 and 26 may be evacuated when the upper ends thereof are closed against the atmosphere. The vacuum in the columns is maintained at a value that is sufficient to keep the tape loops therein under moderate tension.

As the tape comes from the file reel 10, it passes over a guide idler 10*a*, down into the control column 24, up around the pinch roller 32, across and under an idler 16*a* which is mounted on the covered portion of the tape processing head 16. The tape then passes over the read/write elements of the tape processing head 16 and under an idler 16*b* on the head cover, from which it passes over the pinch roller 34, down into the vacuum column 26 and up over a guide pulley 18a to the machine reel 18.

The side walls of the vacuum columns 24 and 26 are of a width not substantially more than the width of the tape 14. When a tape loop is formed, therefore, in either of the vacuum columns 24 or 26, the opposite edges of the tape forming the loops will be in substantial contact with the respective back plate and the face plate of the columns. The back of the tape in the tape loop is spaced from the side walls of the vacuum columns throughout substantially the entire length of the loop, but the bight of the loop is in substantial contact with the side walls. This disposition of the tape loop within the vacuum columns 24 and 26 is assured by the disposition of the tape guides above described. The horizontal distance between the outer periphery of the guide idler 10a and the pinch roller 32 is somewhat less than the spacing of the inner face of the column side walls. The same is true of the horizontal spacing of the guide idler 18a and the pinch roller 34 at the right of the structure.

Spaced along the length of each of the control columns 24 and 26 are two vacuum operated switches. In FIG. 1 of the drawings, vacuum switch RUV is the right upper vacuum switch, while the vacuum switch RLV is the right lower vacuum switch. Similarly, the control column 24 has a left upper vacuum switch LUV and a left lower vacuum switch LLV. The vacuum switches have a normally closed contact point and a normally open contact point. The switches communicate with the interior of their respective control columns through apertures in the back plates thereof.

During normal operation of the machine, the tape loops in columns 24 and 26 will be disposed between the switches RUV—RLV and LUV—LLV of the respective column pairs. Under these conditions, the switches LUV and RUV are subject to atmospheric pressure only, whereas the switches LLV and RLV are influenced by vacuum in the columns 24 and 26, the tape loops constituting a column air seal above the switches LLV and RLV.

The device is designed such that the tape loops in the control columns 24 and 26 are maintained between the respective upper and lower vacuum switches. To this end, the vacuum switch LUV is in the control circuit of the magnetic coil in the unreeling clutch 40, while the vacuum switch LLV is in the control circuit for the magnetic coil of the reeling clutch 42. In like manner, the vacuum switch RUV is in the control circuit of the unreeling clutch 48, while the vacuum switch RLV is in the control circuit of the reeling clutch 46.

Should either tape loop drop below its lower vacuum switch, such switch will be subject to atmospheric pressure, causing the contacts thereof to transfer. Consequently, under such conditions, the switch LLV will call into action the file reel reeling clutch 42 and the switch RLV will call into operation the machine reel reeling clutch 46. Tape will, therefore, be taken up by the reeling action of the respective reels, or either thereof, until the bight of the loop is above the lower control column switch, whereupon the switch will again transfer its contacts under influence of the vacuum within the column.

In like fashion, the upper vacuum switches LUV and RUV are subject to atmospheric pressure during normal operation of the machine and will transfer their contact points when the bight of the tape loop rises above these switches. Under these conditions, the upper switches will be subject to the vacuum within their respective control columns. The low pressure transfers the contact points of the upper switch structures. Upon such transfer, the switch LUV will serve to energize the unreeling clutch 40, and the switch RUV will call into action the unreeling clutch 48, whereby the file reel 10 and the machine reel 18, respectively, or either of them, will be rotated to unreel tape therefrom and thereby lengthen the loop in the control columns 24 and 26, respectively, until the bight thereof once more drops below the upper switches LUV and RUV.

From the foregoing it will be seen that the operation of the tape reels 10 and 18 is in effect self-compensating, whereby the tape loops in the control columns 24 and 26 are maintained in an optimum position within the length of the columns.

Figure 5:
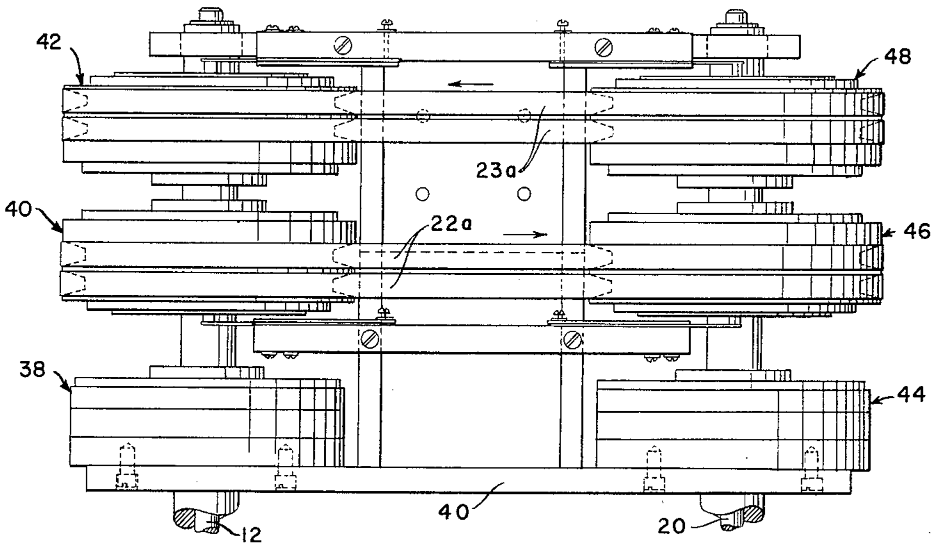
FIG. 5 is a plan view of an electromagnetic clutch system by which a pair of tape reels are driven.

The mechanism for driving the tape through the tape processing head 16, which has been briefly referred to above, is shown in FIG. 5. The drive capstans 28 and 30 are constantly driven by means of a capstan motor 62 (FIG. 3) whose shaft 64 rotates in a counterclockwise direction. The drive capstans 28 and 30 are journalled for rotation in the main plate 13 of the machine, and the shafts 28a and 30a extend to the rear of the main plate 13 where they have affixed thereto belt pulleys 66 and 68, respectively. A drive belt 70 is trained about the pulley 68, a motor shaft pulley 72, and an idler pulley 74 such that upon counterclockwise rotation of the motor shaft 64, the capstan shaft 28a will be constantly rotated in a counterclockwise direction while the capstan shaft 30a will be constantly rotated in a clockwise direction.

By reference to FIG. 5 of the drawings, it will be seen that the pinch rollers 32 and 34 are mounted for rotation at the free end of levers 76 and 78, respectively. The inner ends of the levers 76 and 78 are fixed to pivot shafts 80 and 82 respectively. The pivot shafts 80 and 82 are journalled for rocking movement in the main plate 13 and each of these shafts has attached thereto a short link 84 and 86, respectively. The inner free ends of the links 84 and 86 have pivoted thereto levers 88 and 90, respectively, which, in turn, have their opposite ends pivoted to a common operating lever 92. With the foregoing structure, the pinch rollers 32 and 34 may be selectively engaged with their related drive capstan. Thus, the pinch rollers 32 may be brought into contact with the forward drive capstan 28, and the pinch roller 34 may be selectively engaged with the backward drive capstan 30.

In order to impart controlled movement to the pinch rollers 32 and 34, there has been provided herein a forward-backward actuator comprising a high speed forward magnet 94, a backward magnet 96 and a drive-stop actuator 98 which consists of a drive-stop moving coil 100 in a field of high flux density caused by a permanent magnet 102. The forward and backward magnets 94 and 96 are mounted on a supporting yoke 104 in axial relation to each other such that they are spaced from each other and provide therebetween a space to accommodate a pivot armature 106 to the free end of which the operating lever 92 is attached by means of a pivot stud 108. The drive-stop moving coil 100 has affixed thereto a rod 110 which is connected to the free end of the operating lever 92.

When the drive-stop actuator 98 is energized to repel the drive-stop moving coil 100 an upward thrust will be delivered to the rod 110. This will move the linkage to force the pinch rollers 32 and 34 downwardly and outwardly. When the forward magnet 94 is energized, while the coil 100 of the drive-stop actuator is being repelled, the armature 106 will be attracted thereto and the operating lever 92 will be biased to the left, so that the pinch roller 32 is engaged with the forward drive capstan 28. This will cause the tape to be driven toward the tape processing head 16.

The drive-stop actuator 98 can be energized to either attract the drive-stop coil 100 to the magnet 102 or to repel the coil. When the actuator is energized to attract the drive-stop moving coil 100, the rod 110 will be drawn downwardly with the result that the pinch rollers 32 and 34 will be projected upwardly and inwardly. If, however, the drive-stop actuator 98 is energized to repel the drive-stop moving coil 100, an upward thrust will be delivered to the rod 110. This will move the linkage system to force the pinch rollers 32 and 34 downwardly and outwardly. In order to drive tape in either direction, the rod 110 must be projected upwardly.

When the forward magnet 94 is energized, with the rod 110 forced upwardly, the armature 106 will be attracted to the forward magnet 94 and the operating lever 92 will be biased to the left. This results in movement of the pinch roller 32 toward the forward drive capstan 28, such that the tape is engaged in driving contact with the capstan 28. Under these conditions, the tape will be driven toward the tape processing head 16.

To bias the pinch roller 34 toward the backward drive capstan 30, it is necessary to energize the backward magnet 96. This will move the lever 92 to the right such that the pinch roller 34 is also moved toward the right until the tape is in drive engagement with the backward drive capstan 30. Under these conditions, the tape will be driven toward the tape processing head by the mechanism at the right thereof.

Figure 6:
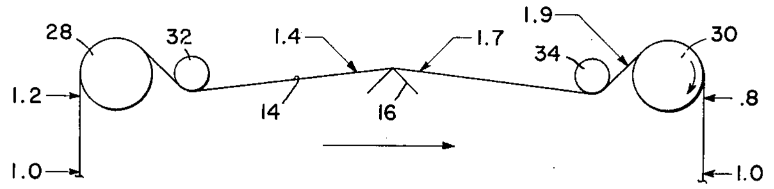
FIG. 6 is a diagram indicating units of tape tension in the region of the tape driving mechanism when tape is pulled across a tape processing head from the downstream side thereof.
Figure 7:
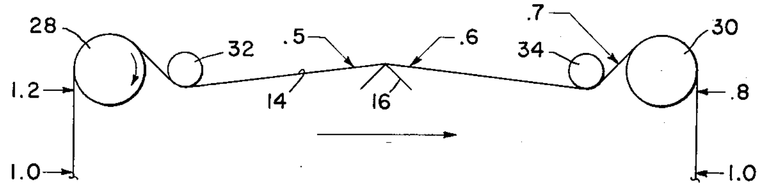
FIG. 7 is a diagram corresponding to that of FIG. 6 showing, however, the relative tension produced when tape is delivered to the tape processing head from the upstream side thereof.

Suitable stop mechanisms may be embodied in the tape driving system to stop and hold the tape in those intervals during which no movement thereof is required The effective reduction of tape tension when the tape is driven according to the present invention, can be seen by comparing FIGS. 6 and 7. These figures are based on a tape feeding operation performed in a tape transport corresponding generally to that described above. Accordingly, corresponding reference numerals have been applied to FIGS. 6 and 7. In these figures, the tape driving capstans 28 and 30 have associated therewith pinch rollers 32 and 34, respectively, between which rollers is a tape processing head 16 over which the tape is to be driven.

In each case, a tape 1.75 inches in width was fed across the tape processing head at a rate of 235 inches per second from a tape loop in a vacuum column at the left and was looped into the vacuum column at the right. The loops within the vacuum columns were maintained approximately 18 inches in length, the length of the vacuum columns from top to bottom being 34 inches and the vacuum within the columns being maintained sufficiently large so that the reduction of tension at the "off" side of the capstan caused by acceleration of the tape did not go to zero. This vacuum produced a tape tension of 1.2 units at the top of the tape loops where they engaged the drive capstans at the left and 1.0 unit of tension along the loops within the columns. The tension at the corresponding position at the top of the loops in the columns at the right in each case was .08 unit and 1.0 unit at the bottom of the same loops. In each case, tape was driven from left to right.

When the tape was drawn across the processing head 16 by rotation of the capstan 30, at the right of the processing head in FIG. 6, 1.4 units of tension developed in the tape at the entrance to the head, 1.7 units developed at the exit of the head, and 1.9 units developed between the capstan 30 and the guide roller 34. However, when tape was delivered to the processing head 16 by rotating the capstan 28 at the upstream side of the head 16, as in FIG. 7, these respective tensions were substantially reduced. When so delivered, the tape at the entrance of the processing head 16 was .5 unit of tension, at the exit of the head it was .6 unit, and between the capstan 30 and the pinch roller 34, it was .7 unit.

The illustrative tensions shown in FIGS. 6 and 7 have been normalized so as to make the nominal tension in the columns "one." These tensions represent conditions existing during acceleration. Therefore, the tension at any point is equal to one unit plus or minus the force required to overcome friction and accelerate the tape mass; the direction of acceleration with respect to the accelerating device determining whether it is plus or minus. In an exemplary system, a tension of 1.6 pounds per inch of width was employed on a 1.75 inch wide tape.

In accordance with the tape delivery arrangement of FIG. 7, the reduction in tape tension resulted in less drag of the tape on the tape processing head 16 and this substantially improved tape acceleration and reduced tape wear. More important perhaps was the fact that the hydrodynamically lubricated air film between the tape and the processing head became effective more rapidly since the lower tension in the tape permitted the air film between the tape and the head surface to build up more rapidly.

It has been convenient to explain the invention in connection with the tape driving mechanism of the above-identified Weidenhammer and Buslik patent because that patent provides a complete prior art disclosure of a well-known tape transport. Those skilled in the art are also familiar with tape driving capstans and other tape bearing surfaces in tape transport devices which are perforate and depend for their operation on differential air pressures at opposite faces of the tape. One such device is a rubber covered capstan which drives the tape by traction of the rubber covering and provides for the free movement of tape over the capstan by directing a stream of air to the under side of the tape through perforations in the capstan. The invention has marked utility when used with the intermittently pressurized perforated capstans of the kind described, since the pressures required to cause the tape to float freely on such capstans are less and, therefore, the pressure can be dissipated more rapidly with the result that a shorter start time is produced. The invention is equally useful with conventional vacuum capstans.

While the fundamentally novel features of the invention have been illustrated and described in connection with a specific embodiment thereof, it is believed that this embodiment will enable others skilled in the art to apply the principles of the invention in forms departing from the exemplary embodiment herein, and such departures are contemplated by the claims.

What is claimed is:

1. In a tape transport, a pair of rotary tape reels, first and second means located between said reels for applying constant tension to a tape passing between said reels, a tape processing unit located between said first and second tension means, a rotary tape driving capstan associated with each of said constant tension means, means for selectively driving one of said tape driving capstans in a direction to pull tape from its associated constant tension means and deliver the same to said tape processing unit, and means for disabling the other of said capstans whereby its associated constant tension means is operative on tape beyond said tape processing unit as the principal force adapted to pull tape beyond said unit.

2. In a tape transport, a pair of rotary tape reels, first and second vacuum means located between said reels for applying constant tension to a tape passing between said reels, a tape processing unit located between said first and second vacuum means, a rotary tape driving capstan associated with each of said vacuum means, means for selectively driving one of said tape driving capstans in a direction to pull tape from its associated constant vacuum means and deliver the same to said tape processing unit, and means for disabling the other of said capstans whereby its associated vacuum means is operative on tape beyond said tape processing unit as the principal force adapted to pull tape beyond said unit.

3. In a tape transport, a pair of rotary tape reels, a first and second vacuum column located between said reels for applying constant tension to a tape passing between said reels, a tape processing unit located between said first and second vacuum columns, a rotary tape driving capstan associated with each of said vacuum columns, means for selectively driving one of said tape driving capstans in a direction to pull tape from its associated vacuum column and deliver the same to said tape processing unit, and means for disabling the other of said capstans whereby vacuum in its associated vacuum column is operative on tape beyond said tape processing unit as the principal force adapted to pull tape beyond said unit.

4. In a tape transport, a pair of tape reels, means for applying constant tension to a loop of tape depending from each of said tape reels, a tape processing unit located between said first and second tension means, a rotary tape driving capstan associated with each of said constant tension means, means for selectively rotating one of said tape driving capstans in a direction to pull tape from its associated constant tension means and deliver the same to said tape processing unit, and means for disabling the other of said capstans whereby its associated constant tension means is operative on tape beyond said tape processing unit as the principal force adapted to pull tape beyond said unit.

References Cited in the file of this patent

UNITED STATES PATENTS

| | | |
|---|---|---|
| 2,501,573 | McLouth et al. | Mar. 21, 1950 |
| 2,792,217 | Weidenhammer et al. | May 14, 1959 |